United States Patent
Morjaria et al.

(10) Patent No.: US 8,095,244 B2
(45) Date of Patent: Jan. 10, 2012

(54) INTELLIGENT ACTIVE POWER MANAGEMENT SYSTEM FOR RENEWABLE VARIABLE POWER GENERATION

(75) Inventors: Mahesh Amritlal Morjaria, Marietta, GA (US); Minesh Ashok Shah, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/850,825

(22) Filed: Aug. 5, 2010

(65) Prior Publication Data

US 2011/0144816 A1 Jun. 16, 2011

(51) Int. Cl.
*G06F 1/26* (2006.01)
(52) U.S. Cl. .......... 700/287; 290/44
(58) Field of Classification Search .......... 700/287; 290/44, 55
See application file for complete search history.

(56) References Cited

U.S. PATENT DOCUMENTS

| | | | |
|---|---|---|---|
| 2006/0273595 A1* | 12/2006 | Avagliano et al. | 290/44 |
| 2007/0120369 A1 | 5/2007 | Delmerico et al. | |
| 2009/0194995 A1 | 8/2009 | Delmerico et al. | |
| 2009/0218817 A1 | 9/2009 | Cardinal et al. | |
| 2010/0180694 A1* | 7/2010 | Ely, III | 73/861.42 |

* cited by examiner

*Primary Examiner* — Ryan Jarrett
(74) *Attorney, Agent, or Firm* — Dority & Manning, P.A.

(57) ABSTRACT

A method and system for intelligently directing output boost capabilities of wind turbine generators operating together in a wind plant has been provided. Selected ones of the wind turbine generators have their own individual boost modes of operation that can provide a limited time increase in power output. This boost capability of the selected individual generators is conveyed to the wind plant control upon request and is used to direct individual boot operations of the generators. In some embodiments, weather forecast information including wind forecast information is used to calculate the generators present and future forecasted boost capabilities.

14 Claims, 2 Drawing Sheets

INTELLIGENT ACTIVE POWER MANAGEMENT SYSTEM FOR RENEWABLE VARIABLE POWER GENERATION

FIELD OF THE INVENTION

The present invention relates generally to the field of wind turbine generators, and, more particularly, to methods and systems to allow for intelligent, temporary increases in the power output of wind turbine generators for stabilizing power during transient conditions.

BACKGROUND OF THE INVENTION

Wind turbine generators are regarded as environmentally friendly and relatively inexpensive alternative sources of energy that utilize wind energy to produce electrical power. A wind turbine generator generally includes a wind rotor having turbine blades that transform wind energy into rotational motion of a drive shaft, which in turn is utilized to drive a rotor of an electrical generator to produce electrical power. Modern wind power generation systems typically take the form of a wind-farm having multiple such wind turbine generators that are operable to supply power to a transmission system providing power to a utility system.

These wind turbine generators and wind-farms are typically designed to deliver power to the utility system with the power being independent of system frequency. Some wind turbine generators have a variable frequency operation and require a variable frequency power electronic inverter to interface the wind turbine generator output with the utility grid. In one common approach, the wind turbine generator output is directly fed to a power electronic converter, where the turbine frequency is rectified and inverted into a fixed frequency as needed by the utility system. An alternative approach uses a doubly fed asynchronous generator (DFAG) with a variable frequency power electronic inverter exciting the DFAG rotor and stator windings being coupled directly to the utility system.

In traditional power systems, the frequency of the synchronous generators of the power system match the utility system, and the dynamic response of the frequency of the utility system is dependent upon the inertia of the synchronous generators and loads. Synchronous generators used in a traditional power system are able to contribute in frequency and voltage control of the power system during transient conditions, that is, sudden failure of generation, line fault or connection of a large load. During such transient conditions, the system frequency starts to change at a rate mainly determined by the total angular momentum of the system, which is a sum of the angular moment of all the generators and rotating loads connected to the power system. In such transient conditions, the synchronous generators may also provide additional control services that modulate active power to stabilize the power system and restore frequency to its nominal value.

Wind turbines, when used for generating power in a power system, however, do not generally contribute to the frequency stabilization of the utility system. As more power generated by wind turbines is interfaced through the utility system, it would be desirable for wind turbines to also contribute to the voltage and frequency control of the power system in transient conditions in order to stabilize the power system.

Therefore there is a growing need to overcome the above mentioned limitations for wind turbine systems and to provide control techniques so that the wind turbines can participate more intelligently in frequency regulation and power-swing stabilization for the utility system.

BRIEF DESCRIPTION OF THE INVENTION

Aspects and advantages of the invention will be set forth in part in the following description, or may be obvious from the description, or may be learned through practice of the invention.

In accordance with aspects of one exemplary embodiment, a control method for a variable frequency wind plant is provided, the wind plant including a plurality of variable frequency wind turbine generators selected ones having output boosting capabilities. The method includes determining whether the wind power plant output is less than a desirable amount, querying each of the wind turbine generators to determine their individual output boost capabilities, and commanding at least one of the wind turbine generators to boost their output to make up at least a portion of the difference between the current wind power plant output and the desired output. In particular embodiments, the method provides for commanding selected ones of the wind turbine generators to boost their output to a desired level within their individually reported capabilities.

In some embodiments, the method may further include providing weather forecast information from a central location (which may include wind forecast information) to selected ones of the plurality of wind turbine generators, configuring the wind turbine generator control circuits to forecast boost capabilities based on the weather forecast information, and providing the forecasted boost capabilities in response to a query.

In selected embodiments, the wind forecast information covers a first predetermined time period and the forecasted boost capabilities covers a second predetermined time period including at least a portion of the first predetermined time period. In particular embodiments, the weather forecast information is generated locally at the site of individual wind turbine generators.

Another exemplary embodiment of the present disclosure is directed to a wind power plant that includes a plurality of wind turbine generators. Selected ones of the generators has output boosting capabilities and each generator output provides a portion of the wind plant output. A turbine control is associated with each respective wind turbine generator and may be configured to analyze its respective generator's output boosting capabilities. A measurement device is configured to monitor the total output power produced by the plurality of wind turbine generators. A wind plant control is configured to query each of the plurality of turbine controls to determine their respective wind turbine generator's output boost capability and to command selected ones of the wind turbine generators to enter an output boost mode, whereby the wind plant control may intelligently command selected of the individual wind turbine generators to boost their output power to a desired level within their reported respective boost capabilities upon determination that the total output power monitored by the measurement device is less than a desired level.

In certain embodiments, the wind power plant further includes a central source of weather forecast information, wherein the source of weather forecast information supplies weather forecast information to selected ones of the turbine controls, and wherein selected ones of the turbine controls are configured to analyze the weather forecast information and forecast present and future output boost capabilities for its respective wind turbine generator.

A further exemplary embodiment of the present disclosure is directed to a control method for a wind power plant, the wind power plant including a plurality of wind turbine generators where selected ones of the generators has output boosting capabilities and each contributes to the total output of the wind plant. The method includes monitoring the total output of the wind plant to determine whether the total output is less than a desired level, analyzing the boost capabilities of each of the plurality of wind turbine generators, and commanding selected ones of the plurality of wind turbine generators to boost their output in dependence on their individual boost capabilities. In selected embodiments, the method provides weather forecast information relative to the wind power plant location and analyzes the boost capabilities of each of the plurality of wind turbine generators based at least in part on the weather forecast information.

Variations and modifications can be made to these exemplary embodiments of the present disclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
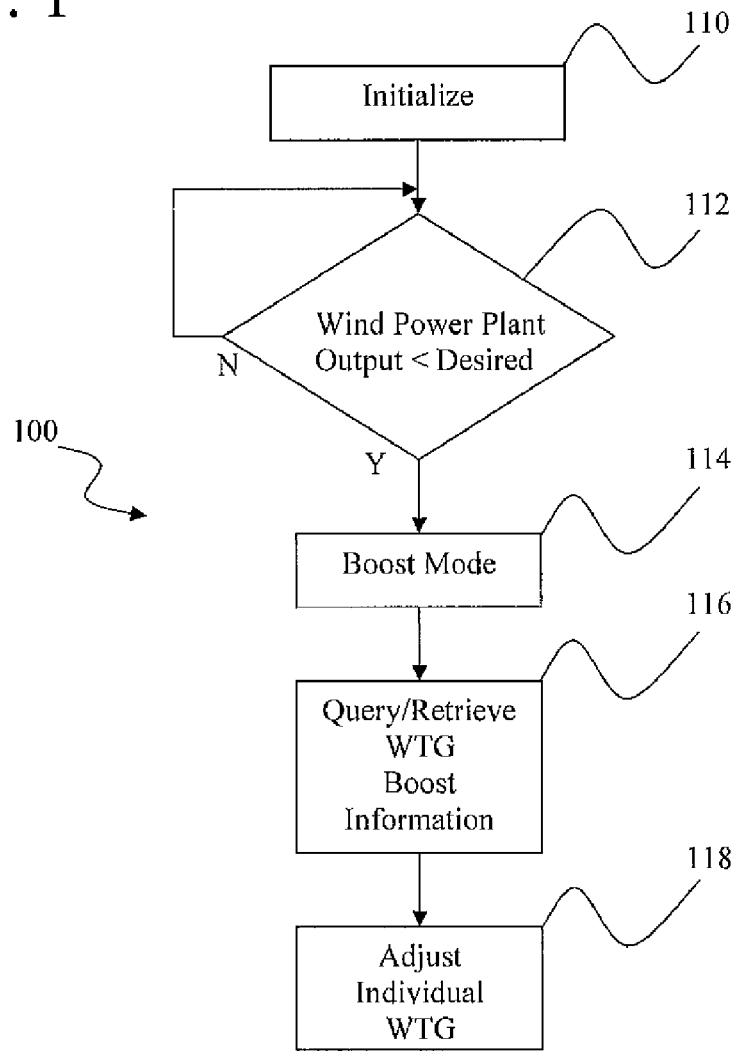
FIG. 1 illustrates a flow chart outlining the intelligent active power management methodology in accordance with present technology.

Repeat use of reference characters throughout the present specification and appended drawings is intended to represent same or analogous features or elements of the invention.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention encompass such modifications and variations as come within the scope of the appended claims and their equivalents.

Generally, the present disclosure is directed to methods and apparatus for extending functions currently available in commercial wind plant control systems. A focus of the present technology is on the ability of a wind plant to boost power when the desired plant power is higher that the normal power output of the plant as typically defined by a wind turbine power curve. An aspect to achieving such boosting capability, however, is having wind turbine generators (WTG) that are capable of temporarily boosting their power when commanded by the plant wide control system. An exemplary system describing techniques for temporarily increasing power output from wind turbine generators is described in US Patent Application Publication US 2007/0120369 A 1 to Delmerico et al., assigned to General Electric Company.

Those of ordinary skill in the art will appreciate that curtailing or limiting the total wind plant output is an ability already available in known wind control systems. The present technology, on the other hand, permits the wind plant to increase its normal output, at least temporarily, based on each turbine's boosting capability.

With reference now to the drawings, FIG. 1 illustrates a flow chart outlining the intelligent active power management methodology in accordance with an exemplary methodology embodiment 100. After initialization at step 110 and upon receipt of a command, the plant wide control system checks (at step 112) if the current wind plant power output is less than the desired value or not. If the wind plant power output is less than the desired value, the plant wide control system commands (step 114) selected ones of the wind turbine generators (WTG) under its control to go into a boost mode. In certain instances, the individual turbine control system will require modification to accept the boost command.

The desired wind plant power output is based on a number of factors that may include an external demand that may be based on grid conditions such as low frequency signal, a requirement to meet some original equipment manufacturer (OEM) guaranteed power which may be based on a defined plant wide power curve, and a forecasted available power that is falling short.

In each of these cases, the wind plant control system continually receives from each WTG (or signals each WTG to indicate) a special "boosting" mode condition so that the WTG responds (step 116) with the range of power it can provide in this special boost mode. Some of the wind turbine generators within the wind plant may not have a boost capability. In general, each turbine is configured to respond to this command, by determining its available power in "boost" as well as "normal" mode based on its operating conditions, including without limitation, wind speed, turbine availability, etc., and responding back to the plant wide control system. The turbine control may also provide the duration for which the "boost" can be provided. Having received the individual boost mode capabilities from each WTG, the wind plant control system can then intelligently decide how to achieve, at least as much as possible, the desired plant output and adjust the individual WTG (step 118) as necessary. Based on the reported capabilities, the wind plant control system may command selected ones of the individual turbines to boost their individual outputs to any desired set point between a normal, i.e., no boost, level up to their maximum reported capability and any desired set point there between. In accordance with present technology, a single one, a small number, or all of the turbines having boost capability may be commanded to boost their individual outputs to individually set, possibly different, set points in order to try to achieve the desired wind plant output.

Figure 2:
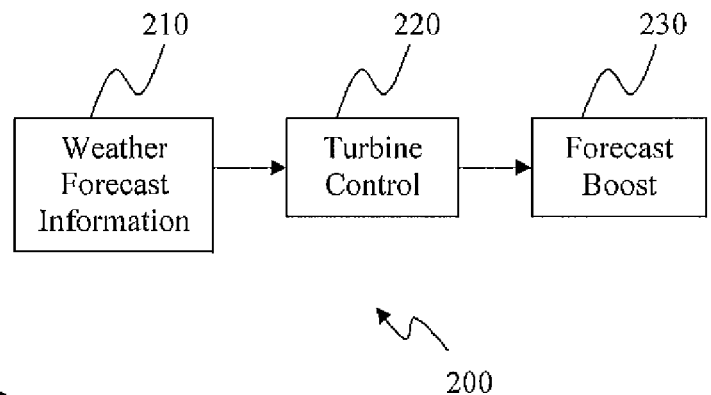
FIG. 2 illustrates a flow chart illustrating the forecast capabilities for the present subject matter; and, FIG. 3 illustrates a schematic block diagram of a wind plant incorporating the present technology.

With reference now to FIG. 2, there is illustrated a flow chart 200 illustrating the forecast capabilities for the present subject matter wherein weather forecast information 210 may be made available to the turbine control 220. Turbine control 220 is configured to provide a forecast 230 of the power boost it expects to be able to provide over at least a portion of the time period covered by weather forecast information 210. In turn, the wind plant control system receives (step 116 of FIG. 1) forecast boost information including expected duration of boost information along with presently available boost information to permit the system and methodology to intelligently specify the additional power required from each WTG and to command them individually (step 118 of FIG. 1) to new settings. Weather forecast information 210 may include a number of different parameters that may have an impact on the power output capabilities of the wind turbine including, but not limited to, wind speed, wind direction, air temperature, and barometric pressure.

Figure 3:
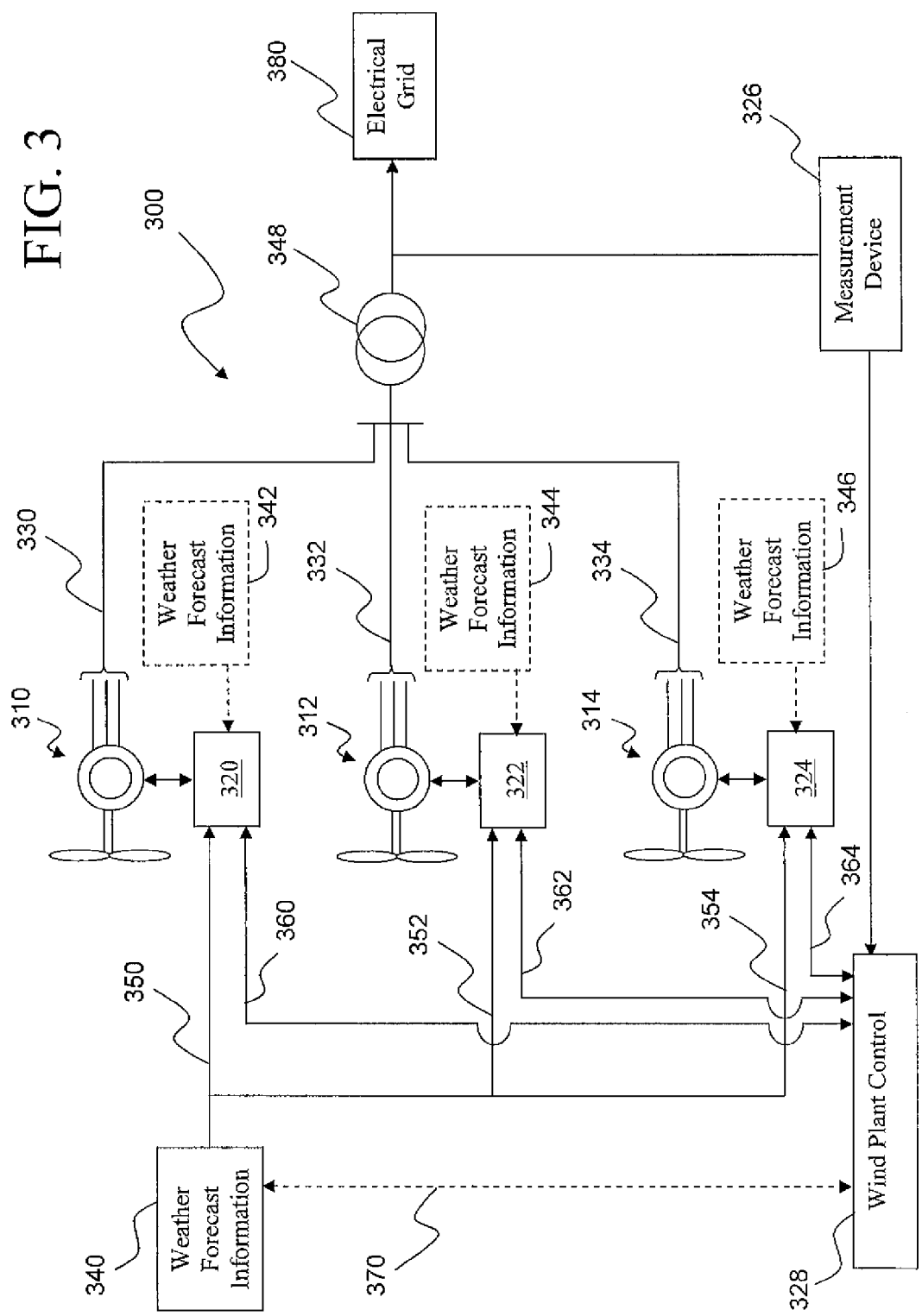

With reference now to FIG. 3, there is illustrated a schematic block diagram of a wind plant 300 incorporating the present technology. As illustrated, wind plant 300 includes a plurality of wind turbine generators 310, 312, 314 each including turbine control devices 320, 322, 324. The output of each of the wind turbine generators 310, 312, 314 is coupled to an electrical grid 380 by way of appropriate cables or lines 330, 332, 334 and transformer 348. A measurement device 326 monitors the output power provided by the wind plant 300 to electrical grid 380 and reports its findings to wind plant control 328.

Weather forecast information 340 is supplied from a central location via communications means 350, 352, 354 to turbine control devices 320, 322, 324 which are configured to analyze the supplied weather forecast information and determine the present and future boost capabilities of their respective wind turbine generator 310, 312, 314. It should be appreciated that communications means 350, 352, 354 may correspond to any of line, fiber optic, or wireless communications means.

In operation, wind plant control 328 queries turbine control devices 320, 322, 324 regarding the results of their analysis and employs the responses in its own analysis as to methodologies for adjusting the respective reported boost capabilities of each wind turbine generator 310, 312, 314. Operational adjustments of the plurality of wind turbine generator 310, 312, 314 may be conducted via communications means 360, 362, 364 which, in a manner similar to communications means 350, 352, 354, may correspond to any of line, fiber optic, or wireless communications means.

In alternative embodiments, weather forecast information 340 may be communicated directly to wind plant control 328 via communications means 370 and redistributed to turbine control devices 320, 322, 324 via communications means 360, 362, 364. In still further embodiments, weather forecast information 342, 344, 346 may be generated locally at the site of individual wind turbine generators 310, 312, 314, respectively, and directly delivered to their respective turbine control devices 320, 322, 324 for analysis.

Those of ordinary skill in the art will appreciate that there is a limit to the total boost that can be provided. Hence, there is a limit to the total power shortfall that can be made up by this feature. Also, it should be kept in mind that there are tradeoffs to be considered in boosting WTG power, so that the WTG should not be set for boost power mode all the time so as to maximize the energy capture from the wind plant.

It should also be appreciated that certain individual wind turbine generator controls can respond with a feature that provides a very short-term temporary boost, as described in US Patent Application Publication US 2009/0194995 A1 to Delmerico et al. that is also assigned to General Electric Company. It should be appreciated, however, that the present subject matter is in addition to such a feature in that the "boost" of the present invention is of a significantly longer duration, i.e., in terms of minutes vs. seconds, to meet desired performance characteristics of the present system and methodology.

Those of ordinary skill in the art will further appreciate that desired performance characteristics may depend on a number of different aspects including not only technical requirements but business requirements as well. As such, specific control algorithms may be varied in dependence upon decisions regarding such aspects. For example, the specifications on the actual measurements on the difference between the actual and desired power output could be decided based on difference at each instant or averaged over a given period of time, or based on other parameters.

Unlike a conventional generation plant, a normally operating wind plant does not have the ability to increase its power when the grid frequency dips and the grid requires additional power to restore the grid frequency to its nominal value. While this shortcoming has been addressed previously by providing a feature that can keep some wind power in "reserve," the economic impact of letting wind go by during that period is significant to make this option not very desirable from a business standpoint.

The previously mentioned reserve feature, provides a very short-term boost, a capability of which the present subject matter can take advantage, but whose current limitations the present technology can go well beyond.

There are customers who desire a guaranteed plant level power curve from original equipment manufacturers. Such a power curve represents the total plant power output based on defined wind speed measurements. The expectation is that the plant will produce power in accordance with such a power curve. If the plant control system detects that the total plant output is falling short of this goal, for example because some WTGs tripped off line, the present technology provides methodologies where it can try to make up the difference by boosting other turbines.

There is an increasing need for the wind plant to provide a forecast of available power over the near term time horizon, for example, averaged over the next half-hour or hour. In that case, the present system can fulfill that need by providing a forecast of available power with and without boost and try to make up the difference if needed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control method for a variable frequency wind plant, the wind plant comprising a plurality of wind turbine generators at least some having output boosting capabilities, comprising:
   determining whether the wind power plant output is less than a desirable amount;
   querying each of the wind turbine generators to determine their individual output boost capabilities; and,
   commanding at least one of the wind turbine generators to boost their output to make up at least a portion of the difference between the current wind power plant output and the desired output.

2. The method of claim 1, wherein commanding the wind turbine generators comprises:
   commanding selected ones of the plurality of wind turbine generators to boost their output to a desired level within their individually reported capabilities.

3. The method of claim 1, further comprising:
provinding weather forecast information to at least some of the plurality of wind turbine generators;
configuring the wind turbine generator control circuit to forecast boost capabilities based on the weather forecast information; and,
providing the forecasted boost capabilities in response to the query.

4. The method of claim 3, wherein providing weather forecast information comprises providing wind forecast information.

5. The method of claim 4, wherein the wind forecast information covers a first predetermined time period and the forecasted boost capabilities covers a second predetermined time period including at least a portion of the first predetermined time period.

6. The method of claim 3, wherein the weather forecast information is generated locally at the site of individual wind turbine generators.

7. A wind power plant, comprising:
a plurality of wind turbine generators, at least some of the generators having output boosting capabilities, each generator having an output providing a portion of the wind plant output:
a plurality of turbine controls, each turbine control associated with a respective wind turbine generator and selected turbine controls configured to analyze their respective generators output boosting capabilities;
a measurement device configured to monitor the total output power produced by the plurality of wind turbine generators; and,
a wind plant control configured to query each of the plurality of turbine controls to determine their respective wind turbine generator output boost capability and to command at least one of the plurality of wind turbine generators to enter an output boost mode,
whereby the wind plant control is configured to command selected ones of the wind turbine generators to boost their output power to desired levels within their reported respective boost capabilities upon determination that the total output power monitored by the measurement device is less than a desired level.

8. The wind power plant of claim 7, further comprising:
a source of weather forecast information,
wherein the source of weather forecast information supplies weather forecast information to at least some of said turbine controls, and wherein said at least some of said turbine controls are configured to analyze the weather forecast information and forecast present and future output boost capabilities for its respective wind turbine generator.

9. The wind power plant of claim 8, wherein the source of weather forecast information is a central source and supplies wind forecast information to at least some of said turbine controls.

10. The wind power plant of claim 9, wherein the wind forecast information covers a first predetermined time period and the forecasted future output boost capabilities covers a second predetermined time period including at least a portion of the first predetermined time period.

11. The wind power plant of claim 8, wherein the weather forecast information is generated locally at the site of selected ones of the plurality of wind turbine generators.

12. A control method for a wind power plant, the wind power plant comprising a plurality of wind turbine generators, at least some of the generators having output boosting capabilities, each generator having an output contributing to the total output of the wind plant, the method comprising:
monitoring the total output of the wind plant to determine whether the total output is less than a desired level;
querying each of the wind turbine generators to determine their individual output boost capabilities;
analyzing the boost capabilities of each of the plurality of wind turbine generators; and,
commanding at least one of the plurality of wind turbine generators to boost their output in dependence on their individual boost capabilities.

13. The method of claim 12, further comprising:
providing weather forecast information relative to the wind power plant location; and,
analyzing the boost capabilities of each of the plurality of wind turbine generators based at least in part on the weather forecast information.

14. The method of claim 13, wherein the weather information provided is wind information.

* * * * *